(12) United States Patent
Li

(10) Patent No.: US 10,938,969 B2
(45) Date of Patent: Mar. 2, 2021

(54) CAMERA ASSEMBLY AND ELECTRONIC DEVICE

(71) Applicant: BEIJING XIAOMI MOBILE SOFTWARE CO., LTD., Beijing (CN)

(72) Inventor: Zhenxu Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/583,585

(22) Filed: Sep. 26, 2019

(65) Prior Publication Data

US 2020/0336575 A1 Oct. 22, 2020

(30) Foreign Application Priority Data

Apr. 16, 2019 (CN) .......................... 201910305723.5

(51) Int. Cl.
*H04M 1/02* (2006.01)

(52) U.S. Cl.
CPC ...... *H04M 1/0264* (2013.01); *H04M 2250/52* (2013.01)

(58) Field of Classification Search
CPC ............. H04M 1/0237; H04M 1/0264; H04M 2250/52; H04N 5/2257; H04N 5/2251
See application file for complete search history.

(56) References Cited

U.S. PATENT DOCUMENTS

| | | | | |
|---|---|---|---|---|
| 8,625,009 B2* | 1/2014 | Yen | ...................... | H04N 5/2257 348/262 |
| 10,425,515 B2* | 9/2019 | Fan | ...................... | H04M 1/0237 |
| 10,444,802 B2* | 10/2019 | Zeng | ................... | H04M 1/0237 |
| 10,637,974 B2* | 4/2020 | Zeng | ...................... | G06F 1/1626 |
| 2006/0033832 A1* | 2/2006 | Shin | ........................ | H05K 1/028 348/335 |
| 2011/0274422 A1* | 11/2011 | Lin | ...................... | H04N 5/2257 396/439 |
| 2015/0189175 A1* | 7/2015 | Fan | ...................... | H04N 5/23238 348/37 |
| 2019/0014201 A1* | 1/2019 | Bao | ....................... | H04M 1/0235 |
| 2019/0230260 A1* | 7/2019 | Zhang | ................... | H04N 5/2257 |
| 2019/0253538 A1* | 8/2019 | Li | ............................. | H01F 7/20 |
| 2019/0253541 A1* | 8/2019 | Fan | ...................... | H04N 1/00307 |
| 2019/0253542 A1* | 8/2019 | Fan | ...................... | H04M 1/0237 |
| 2019/0253543 A1* | 8/2019 | Fan | ...................... | G06F 1/1686 |
| 2019/0310533 A1* | 10/2019 | Xiao | ................... | H04N 5/2254 |
| 2020/0177715 A1* | 6/2020 | Chen | ..................... | G06F 1/1686 |
| 2020/0177779 A1* | 6/2020 | Tsai | ................. | H04N 5/225251 |

FOREIGN PATENT DOCUMENTS

CN 108600596 A 9/2018
WO WO-2020015559 A1 * 1/2020

OTHER PUBLICATIONS

European Search Report for EP application 19206503.5, dated Jun. 9, 2020.

* cited by examiner

*Primary Examiner* — Chiawei Chen
(74) *Attorney, Agent, or Firm* — Syncoda LLC; Feng Ma

(57) ABSTRACT

A camera assembly includes: a driver; a first transmission configured to convert a steering driving force output by the driver into a linear driving force along the rotating axis direction and to transmit the steering driving force; and a camera module capable of cooperating with the linear driving force to reciprocate linearly along the rotating axis direction, and capable of cooperating with the steering driving force to rotate.

17 Claims, 6 Drawing Sheets

CAMERA ASSEMBLY AND ELECTRONIC DEVICE

CROSS-REFERENCE TO RELATED APPLICATIONS

This application claims priority to Chinese Patent Application Serial No. 201910305723.5 filed on Apr. 16, 2019, the entire content of which is incorporated herein by reference.

BACKGROUND

At present, full-screen mobile phones have become trendy in the development of the mobile phone industry. In order to increase the screen-to-body ratio of the mobile phone without affecting its image capturing function, a pop-up camera can be employed on the mobile phone.

SUMMARY

The present disclosure relates generally to the field of terminals, and more specifically to a camera assembly and an electronic device.

Various embodiments of the present disclosure provide a camera structure and an electronic device.

According to a first aspect of embodiments of the present disclosure, there is provided a camera assembly, including: a driving mechanism configured to output a steering driving force; a first transmission mechanism configured to convert the steering driving force into a linear driving force along a rotating axis direction and to transfer the steering driving force; and a camera module capable of cooperating with the linear driving force to reciprocate linearly along the rotating axis direction, and capable of cooperating with the steering driving force to rotate.

According to a second aspect of embodiments of the present disclosure, there is provided another camera assembly, including: a camera module including cameras; a driving mechanism having an output shaft configured to output rotation; and a first transmission mechanism connected to the camera module and comprising: a screw rod coaxially connected with the output shaft to drive at least one of the cameras to rotate, and a sliding plate threadedly fitted with the screw rod to drive the camera module to reciprocate.

According to a third aspect of embodiments of the present disclosure, there is provided an electronic device, including: a device body with an opening at a side edge; and a camera assembly arranged in the device body and including: a camera module comprising a camera, a driving mechanism configured to output a steering driving force; and a first transmission mechanism configured to convert the steering driving force into a linear driving force along a rotating axis direction and to transfer the steering driving force, wherein the linear driving force enables the camera module to reciprocates linearly along the rotating axis direction to make the camera protrude or retract through the opening, and the steering driving force enables the camera module to rotate after the camera protrudes through the opening.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this disclosure, illustrate embodiments consistent with the disclosure and, together with the description, serve to explain the principles of various embodiments of the disclosure.

DETAILED DESCRIPTION

Figure 1:
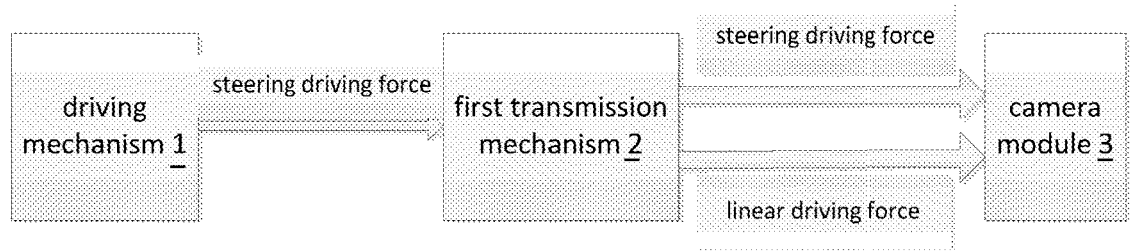
FIG. 1 is a block diagram illustrating a working principle of a camera assembly according to some embodiments.

Various embodiments of the present disclosure will be described in detail and examples of the embodiments will be illustrated in the drawings. When the following description refers to the drawings, unless specified otherwise, the same numbers in different drawings represent the same or similar elements. The implementations described in the following exemplary embodiments do not represent all implementations consistent with the present disclosure, and instead they are merely examples of devices and methods consistent with aspects of the present disclosure as detailed in the appended claims.

In the present disclosure, in the absence of description to the contrary, orientation terms, such as "inner," "outer" or the like are generally in terms of a contour of the corresponding component. In addition, the terms such as "first" and "second" in embodiments of the present disclosure are used to distinguish one element from another element, and are not intended to indicate or imply any sequence or relative importance.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be understood that, although terms such as first, second and third are used herein for describing various kinds of information in this disclosure, such information should not be limited to these terms. These terms are only used for distinguishing the same type of information from each other. For example, without departing from the scope of this disclosure, a first information may also be referred to as a second information, and similarly, the second information may also be referred to as the first information. Depending on the context, the term "if" may be construed to mean "when" or "upon" or "in response to determining."

Various embodiments of the present disclosure provide a camera assembly, including: a driving mechanism configured to output a steering driving force; a first transmission mechanism configured to convert the steering driving force into a linear driving force along a rotating axis direction and to transfer the steering driving force; and a camera module capable of cooperating with the linear driving force to reciprocate linearly along the rotating axis direction, and capable of cooperating with the steering driving force to rotate.

Some embodiments of the present disclosure provide another camera assembly, including: a camera module including cameras; a driving mechanism having an output shaft configured to output rotation; and a first transmission mechanism connected to the camera module and comprising: a screw rod coaxially connected with the output shaft to drive at least one of the cameras to rotate, and a sliding plate threadedly fitted with the screw rod to drive the camera module to reciprocate.

Some embodiments of the present disclosure provide an electronic device, including: a device body with an opening at a side edge; and a camera assembly arranged in the device body and including: a camera module comprising a camera, a driving mechanism configured to output a steering driving force; and a first transmission mechanism configured to convert the steering driving force into a linear driving force along a rotating axis direction and to transfer the steering driving force, wherein the linear driving force enables the camera module to reciprocates linearly along the rotating axis direction to make the camera protrude or retract through the opening, and the steering driving force enables the camera module to rotate after the camera protrudes through the opening.

The various device components, units, blocks, or portions may have modular configurations, or are composed of discrete components, but nonetheless can be referred to as "modules" in general. In other words, the "components," "portions," "modules" or "units" referred to herein may or may not be in modular forms.

FIG. 1 is a block diagram illustrating the working principle of a camera assembly according to some embodiments. As illustrated in FIG. 1, the camera assembly can include a driving mechanism, such as a driver 1, a first transmission mechanism 2 and a camera module 3. The first transmission mechanism 2 is configured to convert a steering driving force output by the driving mechanism 1 into a linear driving force along a rotating axis direction and to transfer the steering driving force. The camera module 3 can cooperate with the linear driving force to reciprocate linearly along the rotating axis direction, and the camera module 3 can cooperate with the steering driving force to rotate. That means the linear driving force enables the camera module 3 to reciprocate linearly along the rotating axis, and the steering driving force enables the camera module 3 to rotate. The driving mechanism 1 can be a motor (such as stepper motor). It is clearly that, in the present disclosure, the steering driving force output by the driving mechanism 1 is converted by the first transmission mechanism 2, such that the camera module 3 can realize two-dimensional cooperative movement without driving mechanisms for outputting different driving forces, thereby simplifying the complexity of the camera assembly and reducing the space occupied by the camera assembly. When the camera assembly is installed in an electronic device, such as a mobile phone, a tablet device, a notebook computer, a wearable device, and a medical device, internal space occupation can be reduced for the electronic device, which helps to optimize an internal structure of electronic device or reduce the volume of the device.

Figure 2:
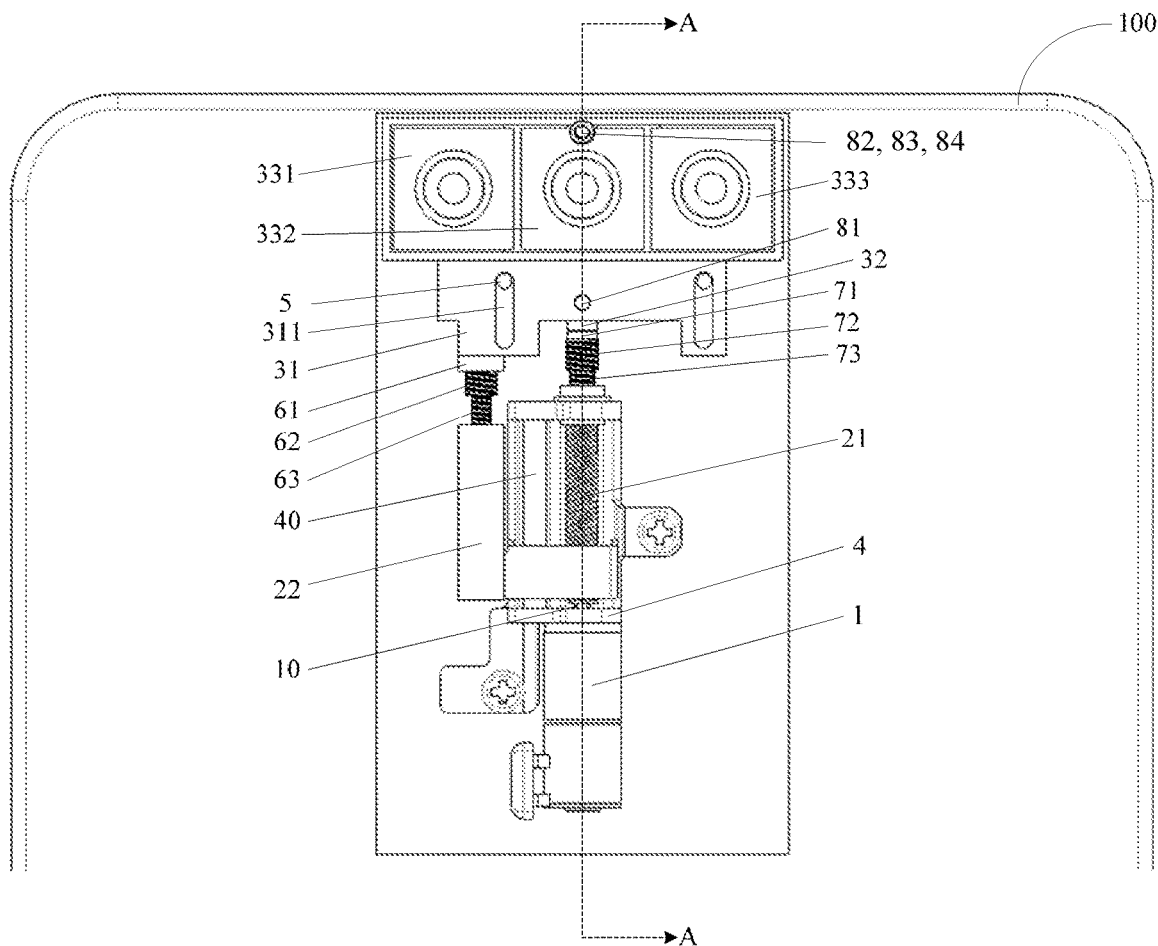
FIG. 2 is a schematic structural diagram of a camera assembly according to some embodiments.
Figure 3:
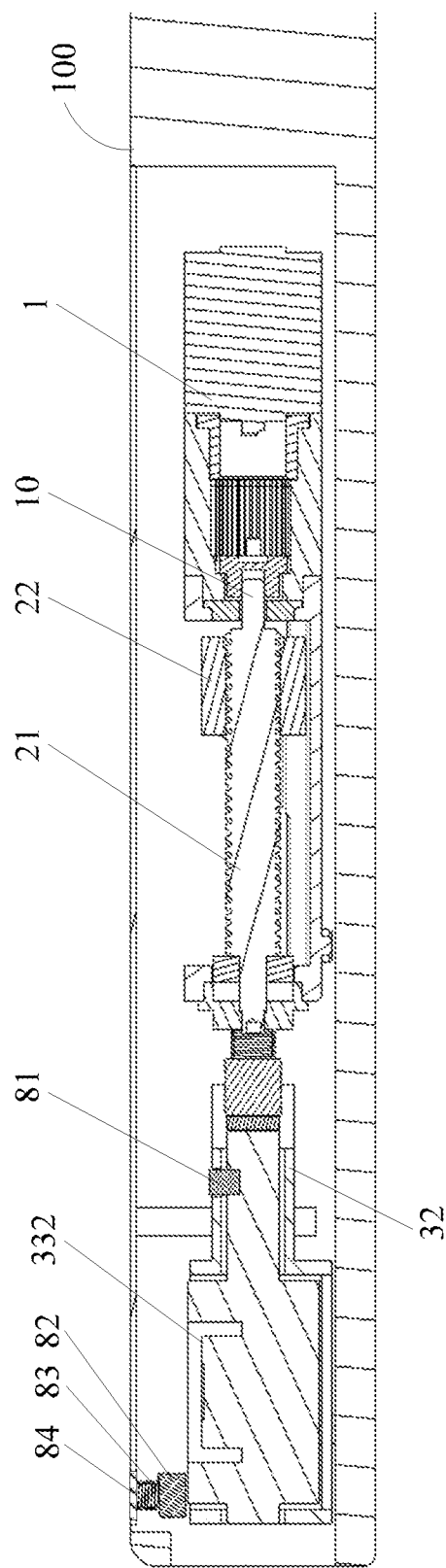
FIG. 3 is a sectional view of the camera assembly illustrated in FIG. 2 along line A-A.

FIG. 2 is a view of a camera assembly according to some embodiments. FIG. 3 is a sectional view of the camera assembly illustrated in FIG. 2 along line A-A. As illustrated in FIGS. 2-3, the first transmission mechanism 2 can include: a screw rod 21 and a sliding plate 22. The screw rod 21 is coaxially connected with an output shaft 10 of the driving mechanism 1, such that the screw rod 21 rotates synchronously with the output shaft 10 to transfer the above-mentioned steering driving force. The sliding plate 22 can be threadedly fitted with screw rod 21, such that the sliding plate 22 reciprocates linearly along the rotating axis direction (such as a vertical direction in FIG. 2 and a horizontal direction in FIG. 3) when the screw rod 21 rotates, to generate the above-mentioned linear driving force.

In some embodiments, when the camera assembly is installed in a device body 100 of an electronic device, an installing support 4 can be fixed in the device body 100, for example the installing support 4 in the embodiment illustrated in FIG. 2 can be tightened by a screw. Accordingly, the driving mechanism 1 can be fixed on the installing support 4, while the screw rod 21 has a lower end connected with the output shaft 10 and an upper end, and the upper end can be inserted in a through hole defined on a top of the installing support 4, the through hole can restrict and fix the screw rod 21. The installing support 4 can also include a slide bar 40, and the slide plate 22 can be fitted over the slide bar 40, such that when the screw rod 21 rotates, the slide bar 40 can restrict the rotation of the slide plate 22 and prevents its rotation, which helps the sliding plate 22 to reciprocate linearly along the slide bar 40.

Therefore, a top of the sliding plate 22 (which is L-shaped in FIG. 2, but the shape of the sliding plate 22 is not limited in this disclosure) can directly or indirectly cooperate with the camera module 3 to transfer the linear driving force to the camera module 3. A top of the screw rod 21 can directly or indirectly cooperate with the camera module 3 to transfer the steering driving force to the camera module 3. Although the sliding plate 22 illustrated in FIG. 2 is arranged at a left side of the screw rod 21, actually, the sliding plate 22 can also have a bilateral symmetrical structure about the above rotating axis, for example the sliding plate 22 can be U-shaped. Accordingly, the number of movement connectors described below can also be 2, and the movement connectors cooperate with movement supports 31 at the left side and right side respectively, to balance forces exerted on both sides and ensure more stable and reliable movement.

Since both the linear driving force and the steering driving force are applied on the camera module 3, therefore, a certain structure is needed to control the cooperation between the first transmission mechanism 2 and the camera module 3, such that only one of the linear driving force and the steering driving force can be applied on the camera module 3 at one moment. That is, linear reciprocation and rotation of camera module 3 do not occur simultaneously.

In some embodiments, a movement connector can be configured to control whether the linear driving force is transferred from the first transmission mechanism 2 to the camera module 3. That is, the movement connector is used to make the camera module 2 cooperate with the linear driving force so as to reciprocate linearly along the rotating axis direction. Also, the movement connector is used to prevent the cooperation between the camera module 2 and the linear driving force when the camera module 2 rotates.

For example, the movement connector can include a first fitting part 61 fixedly connected to the camera module 3, a second fitting part 62 fixedly connected to a first output member (such as the slide plate 22) of the first transmission mechanism 2, and the first output member is configured to output the linear driving force. The second fitting part 62 can be connected with or disconnected from the first fitting part 61. When the first fitting part 61 is connected with the second fitting part 62, the movement connector is used to make the camera module 3 cooperate with the linear driving force, and when the first fitting part 61 is disconnected from the second fitting part 62, the movement connector is used to prevent the camera module 3 from cooperating with the linear driving force.

The first fitting part 61 can be connected with the second fitting part 62 in any form. For example, the first fitting part 61 can be a permanent magnet, and the second fitting part 62 can be an electromagnet. By controlling the magnetism generated by the electromagnet, the first fitting part 61 can be connected with the second fitting part 62 based on heteropolar attraction and can be disconnected from the second fitting part 62 based on homopolar repulsion. Similarly, the first fitting part 61 can be an electromagnet, the second fitting part 62 can be a permanent magnet, or the first fitting part 61 and the second fitting part 62 can be both electromagnets.

In some embodiments, a rotation connector can be configured to control whether the steering driving force is transferred from the first transmission mechanism 2 to the camera module 3. That is, the rotation connector is used to make the camera module 3 cooperate with the steering driving force to rotate. Also, the rotation connector is used to prevent the camera module 3 from cooperating with the steering driving force when the camera module reciprocates linearly along the rotating axis direction.

For example, the rotation connector can include a third fitting part 71 fixedly connected to the camera module 3, a fourth fitting part 72 fixedly connected with a second output member (such as the screw rod 21) of the first transmission mechanism 2, and the second output member is configured to output the steering driving force. The fourth fitting part 72 can be connected with or disconnected from the third fitting part 71. When the third fitting part 71 is connected with the fourth fitting part 72, the rotation connector is used to make the camera module 3 cooperate with the steering driving force. When the third fitting part 71 is disconnected from the fourth fitting part 72, the rotation connector is used to prevent the camera module 3 from cooperating with the steering driving force.

The third fitting part 71 can be connected with the fourth fitting part 72 in any form. For example, the third fitting part 71 can be a permanent magnet, and the fourth fitting part 72 can be an electromagnet. By controlling the magnetism generated by the electromagnet, the third fitting part 71 can be connected with the fourth fitting part 72 based on heteropolar attraction and can be disconnected from the fourth fitting part 72 based on homopolar repulsion. Similarly, the third fitting part 71 can be an electromagnet, the fourth fitting part 72 can be a permanent magnet, or the third fitting part 71 and the fourth fitting part 72 can be both electromagnets.

Figure 4:
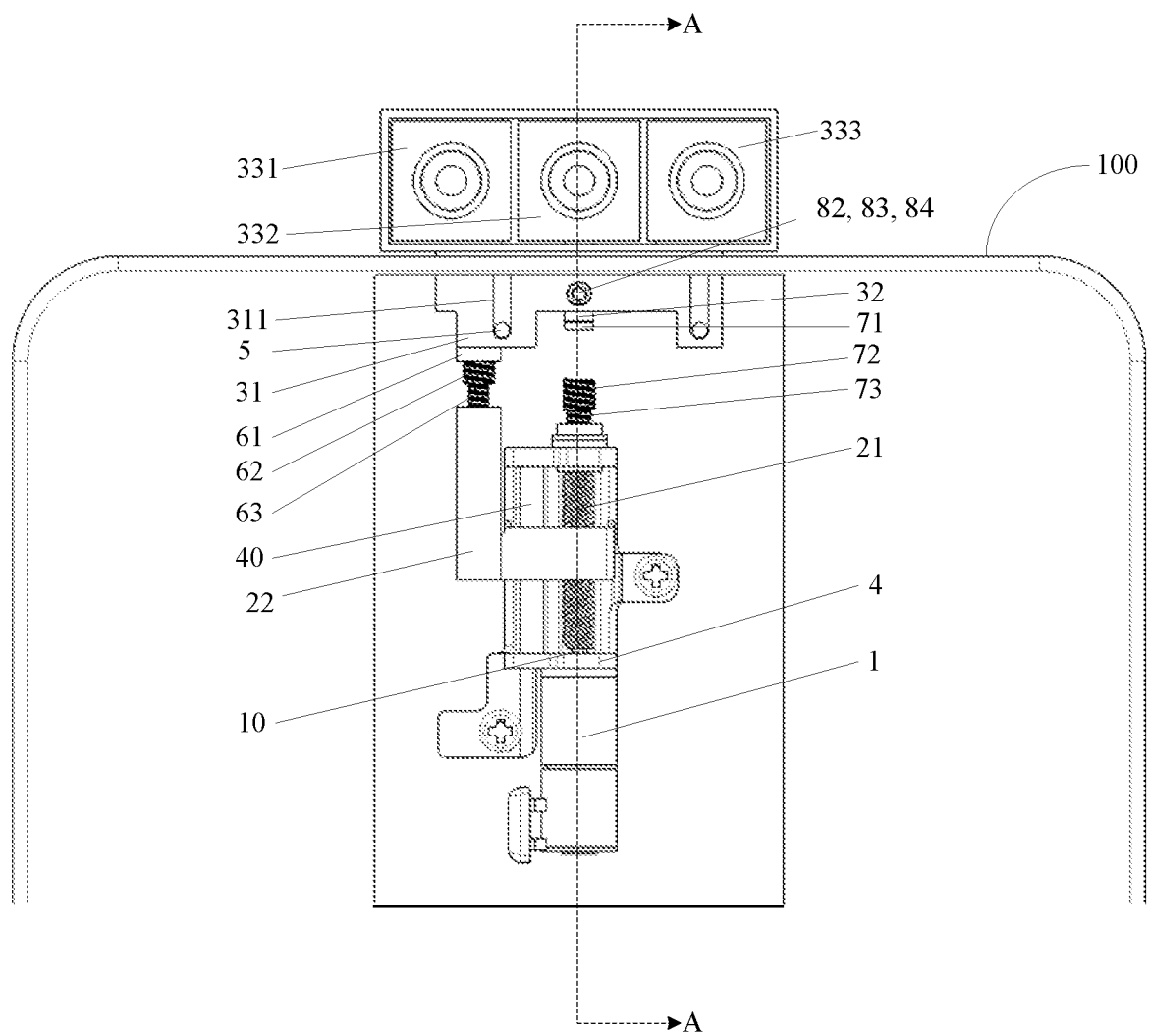
FIG. 4 is a schematic structural diagram of a pop-up camera according to some embodiments.
Figure 5:
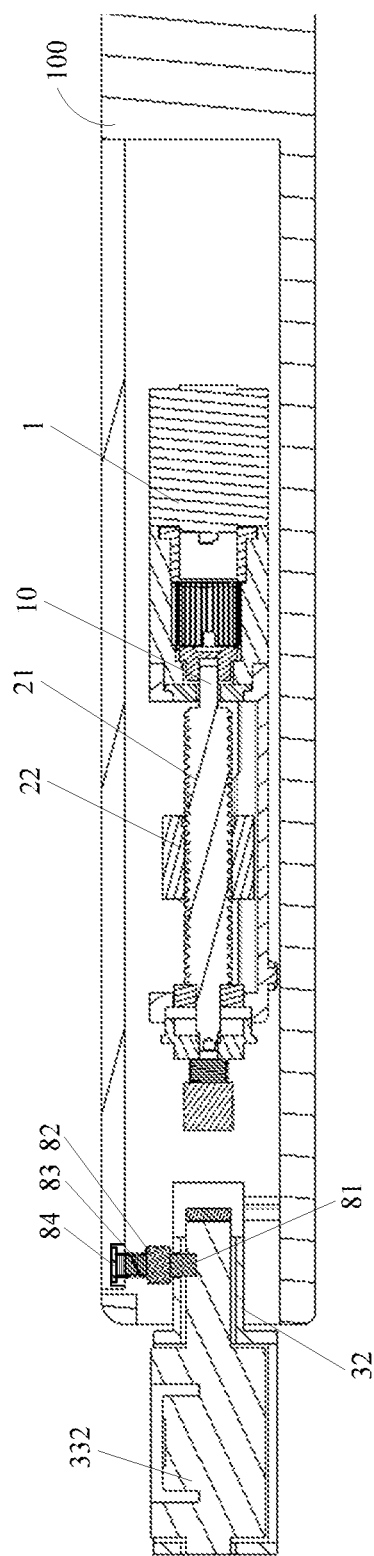
FIG. 5 is a sectional view of the camera assembly illustrated in FIG. 4 along line A-A.

FIG. 4 is a view of a camera which is pop-up according to some embodiments. FIG. 5 is a sectional view of the camera assembly illustrated in FIG. 4 along line A-A. As illustrated in FIGS. 4-5, the first transmission structure 2 exerts the linear driving force on the camera module 3, and the steering driving force is prevented from being exerted on the camera module 3, such that the driving structure 1 can control the camera module 3 to reciprocate linearly by means of the first transmission mechanism 2. For example, the first fitting part 61 is connected with the second fitting part 62 of the above movement connector and the third fitting part 71 is disconnected from the fourth fitting part 72 of the rotation connector, such that the camera module 3 can only cooperate with the linear driving force so as to realize the linear reciprocation, which enables the camera pop up or retract through an opening of a side edge of the device body 100 (which is a top side edge in FIG. 4). For example, when the output shaft 10 of the drive structure 1 rotates forward, the camera module 3 can be switched from a retracted state illustrated in FIG. 2 to a pop-up state illustrated in FIG. 4. When the output shaft 10 of the driving mechanism 1 rotates backward, the camera module 3 can be switched from the pop-up state illustrated in FIG. 4 to the retracted state illustrated in FIG. 2.

In some embodiments, camera module 3 includes a movement support 31, which can cooperate with the linear driving force, a rotation support 32, which can cooperate with the steering driving force, and a support connector, which can be configured to lock the movement support 31 and the rotation support 32 or unlock the movement support 31 from the rotation support 32. Cameras can be arranged on both the movement support 31 and the rotation support 32, such as cameras 331, 333 are arranged on the movement support 31, and a camera 332 is arranged on the rotation support 32. If the movement support 31 and the rotation support 32 are locked by the support connector, when the movement support 31 cooperates with the linear driving force, the rotation support 32 can move synchronously with the movement support 31, such that the camera 332 on the rotation support 32 can reciprocate linearly along the rotating axis direction, such as switching between the retracted state illustrated in FIG. 2 and the pop-up state illustrated in FIG. 4. In the meantime, when the movement support 31 and the rotation support 32 are locked by the support connector, subject to obstruction due to structures of the device body 100, the camera module 3 cannot be driven to rotate even if the steering driving force is applied on the rotation support 32. Therefore, after unlocking the movement support 31 from the rotation support 32 by the support connector, the steering driving force is exerted on the rotation support 32 to drive the camera 332 on the rotation support 32 to rotate. Since the movement support 31 cannot move along with the rotation support 32, the cameras 331, 333 on the movement support 31 cannot rotate.

In some embodiments, the movement support 31 can define a limiting slot 311, and a limiting column 5 is arranged in the device body 100. When the camera module 3 is in the retracted state illustrated in FIG. 2, the limiting column 5 is located at a top of the limiting slot 311. When the camera module 3 is switched from the retracted state to the pop-up state illustrated in FIG. 4, the movement support 31 moves upwards, such that the limiting column 5 moves to a bottom of the limiting slot 311. Thus, with limiting cooperation between the limiting slot 311 and the limiting column 5, the camera module 3 is limited in position so as to prevent the cameral module 3 from further extending to the outside of the device body 100. Similarly, when the camera module 3 returns from the pop-up state to the retracted state, the movement support 31 moves downwards, such that the limiting column 5 moves to the top of the limiting slot 311. Thus, with limiting cooperation between the limiting slot 311 and the limiting column 5, the camera module 3 is limited in position so as to prevent the camera module 3 from further retracting.

In some embodiments, the movement support 31 defines a first through hole, and the rotation support 32 defines a second through hole corresponding to the first through hole. The above support connector can include a positioning pin 81. When the magnetic positioning pin 81 is inserted into the first through hole and the second through hole, the movement support 31 and the rotation support 32 can be locked. When the magnetic positioning pin 81 is pulled out of the first through hole and the second through hole, the movement support 31 can be unlocked from the rotation support 32. The support connector also includes a fitting member 82. When the camera module 3 is in the retracted state illustrated in FIGS. 2-3, the positioning pin 81 is located in the first through hole and the second through hole, locking the movement support 31 and the rotation support 32. Based on the above linear driving force, the sliding plate 22 can push the movement support 31 and the rotation support 32 together to move towards the outside of the device body 100. When the camera module 3 moves to the pop-up state illustrated in FIGS. 4-5, the positioning pin 81 just moves to the fitting member 2, such that the positioning pin 81 can be pulled out of the first through hole and the second through hole by the fitting member 82, and the movement support 31 is unlocked from and the rotation support 32.

In some embodiments, the fitting member 82 can be arranged on an inner wall of the device body 100, that is, the fitting member 82 is not affected by the linear driving force and the steering driving force, while the positioning pin 81 can reciprocate linearly under the action of the linear driving force.

In some embodiments, the positioning pin 81 can be a magnetic positioning pin and the fitting member 82 can be a magnetic fitting member, such that the positioning pin 81 and the fitting member 82 can realize the above cooperation under the magnetic interaction. At least one of the positioning pin 81 or the fitting member 82 can be an electromagnet.

For example, the positioning pin 81 is an electromagnet, while the fitting member 82 is a permanent magnet, or the positioning pin 81 is a permanent magnet, while the fitting member 82 is an electromagnet, or both the positioning pin 81 and the fitting member 82 are electromagnets. By controlling the electromagnet, electromagnetic force of different polarities are generated. The positioning pin 81 can be attracted from the first through hole and the second through hole by the fitting member 82 based on heteropolar attraction, or the positioning pin 81 is inserted in the first through hole and the second through hole based on homopolar repulsion.

In some embodiments, as illustrated in FIG. 3, when the fitting member 82 is located at a lens side of the camera 332, the support connector can include a magnetic control element 84 which is fixed in position, for example the magnetic control element 84 is fixed on the inner wall of the device body 100 and connected to the fitting member 82 by means of an elastic member such as a spring 83. In other words, the fitting member 82 is connected to the magnetic control element 84 by means of the spring 83 so as to be fixed on the inner wall of the device body 100. At least one of the magnetic control element 84 and the fitting member 82 is an electromagnet. For example, the magnetic control element 84 is a permanent magnet, while the fitting member 82 is an electromagnet, or the magnetic control element 84 is an electromagnet, while the fitting member 82 is a permanent magnet, or both the magnetic control element 84 and the fitting member 82 are electromagnets. When the camera module 3 reciprocates linearly along the rotating axis direction, the fitting member 82 is adjacent to the magnetic control element 84 and away from the camera 332, so as to prevent scratches on a lens of the camera 332.

Combining with the embodiments illustrated in FIGS. 2-5, a pop-up process of camera module 3 includes: ensuring that the rotation connector is disconnected and the movement connector maintains in connection, ensuring that the movement support 31 and the rotation support 32 are locked, and the sliding plate 22 generating an upward linear driving force by the forward driving force output by the driving mechanism 1. Then, the linear driving force passes through the movement connector, the movement support 31 and the rotation support 32 in sequence, such that the whole camera module 3 is pushed upwards until the cameras 331-333 pops up through the opening of the device body 100.

Figure 6:
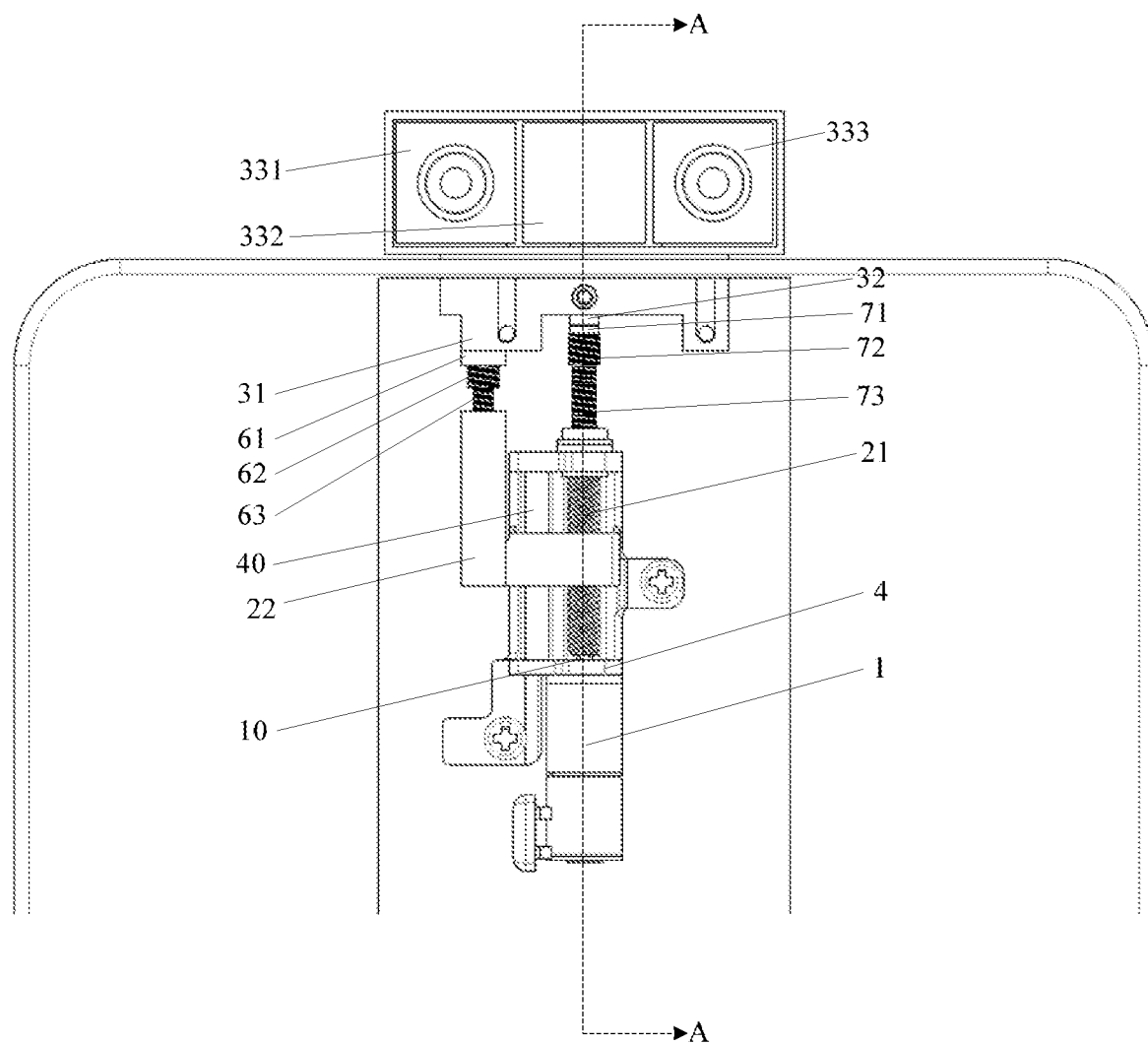
FIG. 6 is a schematic structural diagram of a rotating camera according to some embodiments.
Figure 7:
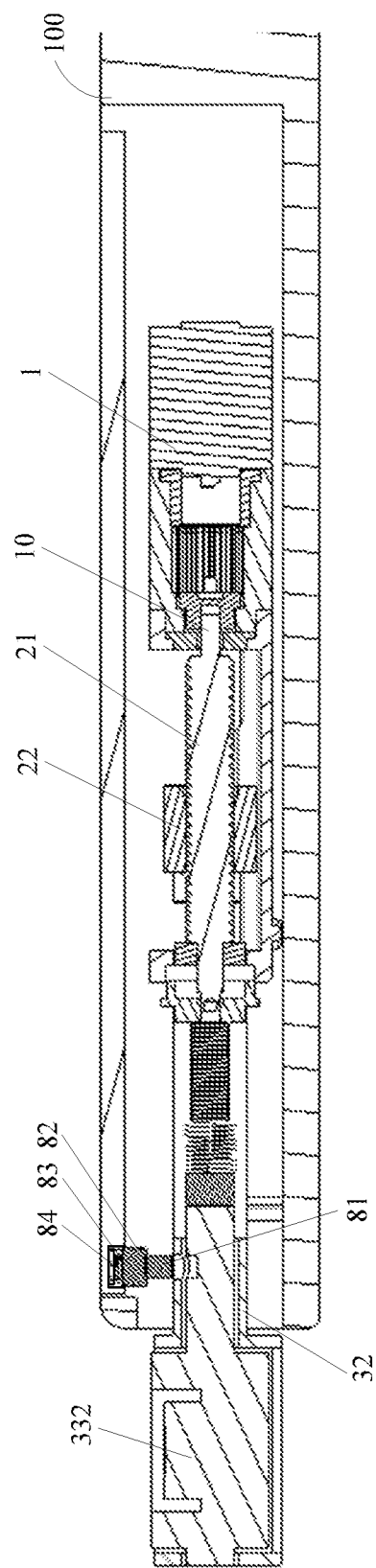
FIG. 7 is a sectional view of the camera assembly illustrated in FIG. 6 along line A-A.

FIG. 6 is a view of a camera which is rotated according to some embodiments. FIG. 7 is a sectional view of the camera assembly illustrated in FIG. 6 along line A-A. As illustrated in FIGS. 6-7, when the camera module 3 is in the pop-up state, by unlocking the movement support 31 from the rotation support 32 and connecting the screw rod 21 with the rotation support 32 through the rotation connector, the rotation support 32 can rotate under the drive of the screw rod 21, thus driving the camera 332 on the rotation support 32 to rotate.

In a case that the camera 332 faces a rear panel side of the device body 100 for example according to some embodiments as illustrated in FIG. 4, that means the camera 332 can be configured as a rear camera. Accordingly, the camera 332 rotates 180 degrees as illustrated in FIG. 6, such that the camera 332 can be configured as a front camera. When the cameras 331, 333, etc. are arranged on the movement support 31, the electronic device can realize the front image capturing and the rear image capturing at the same time by the cameras 331-333. Of course, a rotation angle of the camera 332 is not limited to 180 degrees. For example, the camera can rotate at any angle in a range from 0 degree to 360 degrees, which is not limited in the disclosure.

In some embodiments, the rotation connector also includes an elastic member (such as a spring 73) arranged between the fourth fitting part 72 and the second output member (such as the screw rod 21), such that even if the third fitting part 71 has moved away from the fourth fitting part 72 along with the movement of camera module 3, the connection between the third fitting part 71 and the fourth fitting part 72 can be achieved by stretching deformation of the spring 73, and the steering driving force is transferred to the rotation support 32.

In some embodiments, the movement connector also includes an elastic member (such as a spring 63) arranged between the second fitting part 62 and the first output member (such as the slide plate 22). The first fitting part 61 and the second fitting part 62 are maintained in connection in the whole process, such that the linear driving force can be transferred to the camera module 3 in time and the cameras 331-333 can pop up or retract in time. For example, in the process of unlocking, the cameras 331-333 popping up in time expedites the unlocking efficiency, or for another example, while a falling state is detected, the cameras 331-333 retracting in time avoids damages to the camera module due to direct impact. When the screw rod 21 transfers the steering driving force to the rotation support 32 by the rotation connector, the screw rod 21 actually rotates to some certain extent, which correspondingly results in a certain linear displacement of the sliding plate 22. Hence, when the first fitting part 61 is maintained in connection with the second fitting part 62, the spring 63 can be deformed by stretching or contracting to cooperate with the corresponding linear displacement and avoid related stress transmission to the first fitting part 61, the second fitting part 62 and the movement support 31.

In some embodiments, a plurality of rotation supports 32 are provided, and each of the rotation supports 32 is provided with one or more cameras. The camera module 3 can also include a second transmission mechanism. When any one of the rotation supports can cooperate with the above-mentioned steering driving force, the second transmission mechanism is used to transfer the steering driving force to other rotation supports. For example, when there are three rotation supports, i.e. a first rotation support, a second rotation support, and a third rotation support, the fourth fitting part 72 can be mounted on the first rotation support, the above-mentioned steering driving force can be directly transferred to the first rotation support 321. Then, the second transmission mechanism can further transfer the driving force to the second and third rotation support, such that each of the rotation supports can rotate. For example, the second transmission mechanism can include a gear set. With arrangement of a gear structure, engaging relationship, a gear ratio related to the gear set, whether rotation directions of the rotation supports are consistent and whether rotation angles of the rotation supports are equal or accord with a preset multiple can be controlled, so as to realize the rotation requirements.

In some embodiments, the second transmission mechanism also includes a relay and a plurality of transmission output shafts, and each relay is mounted between a corresponding rotation support 32 and a corresponding transmission output shaft of the second transmission mechanism, so as to control the connection or disconnection between the corresponding rotation support 32 and the transmission output shaft. Therefore, with respect to the "other rotation supports" mentioned above, only in case of in connection with the transmission output shaft, can the other rotation supports rotate in cooperation with the steering driving force, and in case of in disconnection with the transmission output shaft, the other rotation supports cannot rotate. Hence, by controlling the connection or disconnection between the rotation support 32 and the transmission output shaft, whether each of the above-mentioned "other rotation supports" rotates and its rotation angle are independently controlled.

In an aspect, an electronic device or a terminal is provided including the camera assembly or camera module described above. The electronic device or terminal can be, for example, a mobile phone, a tablet computer, a personal digital assistant, etc.

The electronic device can include a device body with an opening at a side edge; and a camera assembly arranged in the device body and including: a camera module including a camera, a driver configured to output a steering driving force; and a first transmission configured to convert the steering driving force into a linear driving force along a rotating axis direction and to transfer the steering driving force, wherein the linear driving force enables the camera module to reciprocates linearly along the rotating axis direction to make the camera protrude or retract through the opening, and the steering driving force enables the camera module to rotate after the camera protrudes through the opening.

The electronic device can include a screen providing an output interface between the device and a user. In some embodiments, the screen can include a liquid crystal display (LCD) and a touch panel (TP). In some embodiments, the screen can include an OLED (organic light emitting diode) display, or other types of displays.

If the screen includes the touch panel, the screen can be implemented as a touch screen to receive input signals from the user. The touch panel includes one or more touch sensors to sense touch, sliding and gestures on the touch panel. The touch sensor can not only sense the boundary of the touch or sliding operation, but also detect the duration and pressure associated with the touch or sliding operation.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized. Some other embodiments of the present disclosure can be available to those skilled in the art upon consideration of the specification and practice of the various embodiments disclosed herein.

The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims. In the present disclosure, it is to be understood that the terms "bottom," "inside," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In the description of the present disclosure, the terms "some embodiments," "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A camera assembly, comprising:
   a driver configured to output a steering driving force;
   a first transmission configured to convert the steering driving force into a linear driving force along a rotating axis direction and to transfer the steering driving force;
   a camera module capable of cooperating with the linear driving force to reciprocate linearly along the rotating axis direction, and capable of cooperating with the steering driving force to rotate;
   a movement connector configured to make the camera module cooperate with the linear driving force to reciprocate linearly along the rotating axis direction, and configured to prevent cooperation between the camera module and the linear driving force when the camera module rotates; and
   a rotation connector configured to make the camera module cooperate with the steering driving force to rotate, and configured to prevent cooperation between the camera module and the steering driving force when the camera module reciprocates linearly along the rotating axis direction,
   wherein the first transmission comprises a first output member configured to output the linear driving force, and the movement connector comprises:
   a first fitting part fixedly connected to the camera module; and
   a second fitting part fixedly connected to the first output member and capable of being connected with or disconnected from the first fitting part,
   wherein when the first fitting part is connected with the second fitting part, the movement connector is configured to make the camera module cooperate with the linear driving force, and when the first fitting part is disconnected from the second fitting part, the movement connector is configured to prevent the camera module from cooperating with the linear driving force,
   wherein one of the first fitting part and the second fitting part is a permanent magnet, and the other one is an electromagnet or the first fitting part and the second fitting part are both electromagnets.

2. The camera assembly according to claim 1, wherein the driver comprises an output shaft, and the first transmission comprises:
   a screw rod coaxially connected with the output shaft to enable the screw rod to rotate synchronously with the output shaft to transfer the steering driving force; and a sliding plate threadedly fitted with the screw rod to enable the sliding plate to reciprocate linearly along the rotating axis direction when the screw rod rotates, to generate the linear driving force.

3. The camera assembly according to claim 1, wherein the movement connector further comprises a first elastic member arranged between the second fitting part and the first output member.

4. The camera assembly according to claim 1, wherein the first transmission comprises a second output member configured to output the steering driving force, and the rotation connector comprises:
  a third fitting part fixedly connected to the camera module; and
  a fourth fitting part fixedly connected to the second output member, and capable of being connected with or separated from the third fitting part,
  wherein when the third fitting part is connected to a fourth fitting part, the rotation connector is configured to make the camera module cooperate with the steering driving force, and when the third fitting part is disconnected from the fourth fitting part, the rotation connector is configured to prevent the camera module from cooperating with the steering driving force.

5. The camera assembly according to claim 4, wherein the rotation connector further comprises a second elastic member arranged between the fourth fitting part and the second output member.

6. The camera assembly according to claim 1, wherein the camera module comprises:
  a movement support capable of cooperating with the linear driving force;
  a rotation support provided with a camera and capable of cooperating with the steering driving force; and
  a support connector configured to lock the movement support with the rotation support or unlock the movement support from the rotation support, wherein in a locked state, the camera on the rotation support reciprocates linearly along the rotating axis direction, and in an unlocked state, the camera on the rotation support rotates.

7. The camera assembly according to claim 6, wherein the movement support defines a first through hole, the rotation support defines a second through hole opposite the first through hole, the support connector comprises:
  a magnetic positioning pin, wherein when the magnetic positioning pin is inserted into the first through hole and the second through hole, the movement support and the rotation support are locked, and when the magnetic positioning pin is pulled out of the first through hole and the second through hole, the movement support is disconnected from the rotation support; and
  a magnetic fitting member, when the camera module moves along the rotating axis direction into a pop-up state, the magnetic positioning pin moves to the magnetic fitting member, and the magnetic fitting member pulls the magnetic positioning pin from the first through hole and the second through hole by magnetic force;
  wherein at least one of the magnetic positioning pin and the magnetic fitting member is an electromagnet to eliminate the magnetic force or generate a reversed magnetic force to enable the magnetic positioning pin to be inserted in the first through hole and the second through hole.

8. The camera assembly according to claim 7, wherein the support connector further comprises a magnetic control element fixed in position and connected to the magnetic fitting member through a third elastic member, at least one of the magnetic control element and the magnetic fitting member is an electromagnet to make the magnetic fitting member adjacent to the magnetic control element and away from the camera when the camera module reciprocates linearly along the rotating axis direction.

9. The camera assembly according to claim 6, wherein the camera module further comprises one or a plurality of cameras arranged on the movement support.

10. The camera assembly according to claim 6, wherein a plurality of rotation supports is provided, each of the rotation supports is provided with one or a plurality of cameras; and the camera module further comprises a second transmission comprising a plurality of transmission output shaft, when any one of the rotation supports cooperates with the steering driving force, the second transmission is configured to transfer the steering driving force to other of the rotation supports.

11. The camera assembly according to claim 10, wherein the camera module further comprises a relay, each relay is mounted between one of the rotation supports and one of the transmission output shafts, to control connection or disconnection between the corresponding rotation support and the transmission output shaft.

12. A camera assembly, comprising:
  a camera module comprising cameras;
  a driver having an output shaft configured to output rotation; and
  a first transmission connected to the camera module and comprising:
    a screw rod coaxially connected with the output shaft to drive at least one of the cameras to rotate,
    a sliding plate threadedly fitted with the screw rod to drive the camera module to reciprocate; and
  a movement connector comprising:
    a first fitting part fixedly connected to the camera module;
    a second fitting part fixedly connected to the sliding plate and capable of being connected with or disconnected from the first fitting part,
  wherein one of the first fitting part and the second fitting part is a permanent magnet, and the other one is an electromagnet or the first fitting part and the second fitting part are both electromagnets.

13. The camera assembly according to claim 12, wherein the movement connector further comprises a first elastic member arranged between the second fitting part and the sliding plate.

14. The camera assembly according to claim 12, further comprising a rotation connector comprising:
  a third fitting part fixedly connected to the camera module;
  a fourth fitting part fixedly connected to the screw rod and capable of being connected with or separated from the third fitting part.

15. The camera assembly according to claim 14, wherein the rotation connector further comprises a second elastic member arranged between the fourth fitting part and the screw rod.

16. The camera assembly according to claim 12, wherein the camera module further comprises:
  a movement support connected with the sliding plate and defining a first through hole;

a rotation support provided with the at least one of the cameras, connected with the screw rod, and defining a second through hole opposite the first through hole; and a support connector comprising:
- a magnetic positioning pin, and
- a magnetic fitting member capable of inserting the magnetic positioning pin into the first through hole and the second through hole or pulling the magnetic positioning pin from the first through hole and the second through hole, wherein at least one of the magnetic positioning pin and the magnetic fitting member is an electromagnet.

17. An electronic device, comprising:

a device body with an opening at a side edge; and a camera assembly arranged in the device body and comprising:

a camera module comprising a camera, a driver configured to output a steering driving force;

a first transmission configured to convert the steering driving force into a linear driving force along a rotating axis direction and to transfer the steering driving force, wherein the linear driving force enables the camera module to reciprocates linearly along the rotating axis direction to make the camera protrude or retract through the opening, and the steering driving force enables the camera module to rotate after the camera protrudes through the opening;

a movement connector configured to make the camera module cooperate with the linear driving force to reciprocate linearly along the rotating axis direction, and configured to prevent cooperation between the camera module and the linear driving force when the camera module rotates; and a rotation connector configured to make the camera module cooperate with the steering driving force to rotate, and configured to prevent cooperation between the camera module and the steering driving force when the camera module reciprocates linearly along the rotating axis direction, wherein the first transmission comprises a first output member configured to output the linear driving force, and the movement connector comprises:

a first fitting part fixedly connected to the camera module; and a second fitting part fixedly connected to the first output member and capable of being connected with or disconnected from the first fitting part, wherein when the first fitting part is connected with the second fitting part, the movement connector is configured to make the camera module cooperate with the linear driving force, and when the first fitting part is disconnected from the second fitting part, the movement connector is configured to prevent the camera module from cooperating with the linear driving force, wherein one of the first fitting part and the second fitting part is a permanent magnet, and the other one is an electromagnet or the first fitting part and the second fitting part are both electromagnets.

* * * * *